(12) United States Patent
Chen

(10) Patent No.: US 7,605,872 B2
(45) Date of Patent: Oct. 20, 2009

(54) VIDEO CONTRAST ADJUSTING METHOD AND SYSTEM

(75) Inventor: Hong-Hui Chen, Hsinchuang (TW)

(73) Assignee: Mediatek Inc., Hsin-Chu (TW)

( * ) Notice: Subject to any disclaimer, the term of this patent is extended or adjusted under 35 U.S.C. 154(b) by 932 days.

(21) Appl. No.: 11/156,884

(22) Filed: Jun. 20, 2005

(65) Prior Publication Data

US 2006/0285768 A1    Dec. 21, 2006

(51) Int. Cl.
*H04N 5/52*    (2006.01)
(52) U.S. Cl. ...................................... 348/678; 348/679
(58) Field of Classification Search ................. 348/678, 348/679, 672, 229.1, 254, 255; 382/274; 345/617; 358/522
See application file for complete search history.

(56) References Cited

U.S. PATENT DOCUMENTS

| | | | | |
|---|---|---|---|---|
| 4,982,287 A * | 1/1991 | Lagoni | ......................... | 348/673 |
| 5,315,389 A | 5/1994 | Izawa et al. | | |
| 5,808,697 A | 9/1998 | Fujimura et al. | ............ | 348/672 |
| 5,822,453 A | 10/1998 | Lee et al. | ..................... | 382/169 |
| 5,959,696 A * | 9/1999 | Hwang | ........................ | 348/678 |
| 6,049,626 A * | 4/2000 | Kim | ............................ | 382/167 |
| 6,463,173 B1 | 10/2002 | Tretter | ......................... | 382/168 |
| 6,728,416 B1 | 4/2004 | Gallagher | .................... | 382/265 |
| 6,982,704 B2 | 1/2006 | Aoki et al. | | |
| 7,050,114 B2 * | 5/2006 | Stessen et al. | .............. | 348/679 |
| 7,286,716 B2 | 10/2007 | Kim | | |
| 2004/0213457 A1* | 10/2004 | Mori | .......................... | 382/167 |
| 2005/0163372 A1* | 7/2005 | Kida et al. | .................. | 382/169 |

FOREIGN PATENT DOCUMENTS

TW        230551        4/2005

OTHER PUBLICATIONS

TW Office Action mailed Mar. 9, 2009.
English abstract of TW230551.

* cited by examiner

*Primary Examiner*—Victor R Kostak
(74) *Attorney, Agent, or Firm*—Thomas, Kayden, Horstemeyer & Risley

(57) ABSTRACT

Methods and systems for adjusting color-saturation contrast of the video signal. Statistical information based on chrominance or luminance measures is analyzed to derive a gain function. The gain function is also determined according to the detection result of an exceptional situation during statistical analysis. The gain function is applied to the video signal to modify the amplitude of the chrominance signal.

28 Claims, 7 Drawing Sheets

VIDEO CONTRAST ADJUSTING METHOD AND SYSTEM

BACKGROUND

The invention relates to video processing, and more specifically, to methods and systems for enhancing the color-saturation contrast of a video signal.

A video signal carries a sequence of video images, each of which is composed of pixels. Each pixel has a value representing the property of the video image at a particular location. Pixel values of the video image must conform to a specified range, for example, a fixed number of bits representing each pixel defines the number of allowable pixel values for output or display, or an output device only supports a certain range of pixel values. The majority of video images output to or displayed on an output device do not make effective use of the full range of pixel values available on the output device. The pixel values of the video image might concentrate in a small portion of the available range, causing the visual appearance to be relatively dull. A contrast enhancer may improve the appearance of the video images by expanding or remapping the pixel values to full scale.

A conventional contrast enhancer employs a histogram equalization method by adjusting luminance values. The pixel values of the video images are altered by histogram equalization to distribute the luminance values as uniformly as possible. The equalization method comprises calculating a normalized cumulative histogram of the luminance values, and remapping the luminance values according to the normalized cumulative histogram.

U.S. Pat. No. 5,822,453 teaches a method for estimating the scene contrast by sampling high contrast pixels and calculating the standard deviation of their log-exposure distribution as a measure of the scene contrast. The input image contrast is adjusted based on the comparison result of the calculated standard deviation and mean contrast of the precompiled population scene contrasts. The contrast is adjusted through a histogram modification process, where the original histogram is mapped through a tone transformation curve into the target histogram. The process comprises forming an intensity histogram that eliminates pixels corresponding to uniform areas or textured portion of the image, and constructing the tone transformation curve by convolving the intensity histogram with a Gaussian distribution.

Video signals carries a luminance signal representing the lightness variation and a chrominance signal representing chromatic variation in the image. Contrast enhancers may improve the image appearance by adjusting either the luminance signal or chrominance signal, or both. A contrast enhancer disclosed in U.S. Pat. No. 5,808,697 tunes the luminance signal by dividing each image into block-shaped areas and calculating a mean luminance level for each area. A selection signal is adjusted in small steps according to the mean luminance levels. The luminance level of the video signal is mapped according to a mapping function selected by the selection signal. The disclosed contrast enhancer also tunes the chrominance signal using the histogram equalization method.

SUMMARY

Video processing methods and systems. An exemplary embodiment of a method for adjusting the contrast of a video signal comprises conducting statistical computation to retrieve statistical information of a first characteristic of the video signal, detecting an occurrence of an exceptional situation according to the statistical information, deriving a gain function based on the statistical information and the detection result of the exceptional situation, and applying the gain function to the video signal to modify the amplitude of a chrominance signal. In some embodiments, the statistic computation is conducted for contrast adjustment when a preset timer is expired, or is conducted every predetermined number of frames.

In some embodiments, a slope is determined by calculating a maximum allowable slope based on the statistical information, then averaging the maximum allowable slope with at least one previous slope in accordance with a weighting factor. The slope may be further adjusted to prevent a slope change between the current slope and previous slope exceeding a predefined value.

In some embodiments, the first characteristic of the video signal for conducting statistical computation is the saturation of the chrominance signal. The exceptional situation is detected when the saturation measure of most pixels in a frame is about the same, and consequently, contrast enhancement is not required. The statistical information is a histogram distribution of the saturation measures, and the gain function is derived by only considering significant groups of the histogram distribution, where insignificant groups are treated as noise or outliers.

In some embodiments, the first characteristic of the video signal for conducting statistical computation is the level of a luminance signal.

An exemplary embodiment of a system for adjusting the contrast of a video signal comprises a memory or registers, a computing unit, a gain function generator, and a gain stage. The memory collects and stores statistical information of a first characteristic of the video signal. The computing unit conducts statistical computation by accessing the statistical information from the memory or registers, and also detects if there is an occurrence of an exceptional situation according to the statistical information. The gain function generator derives a gain function based on the statistical information output from the computing unit. The gain stage applies the gain function derived by the gain function generator to the video signal to generate an enhanced video signal by modifying the amplitude of a chrominance signal.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
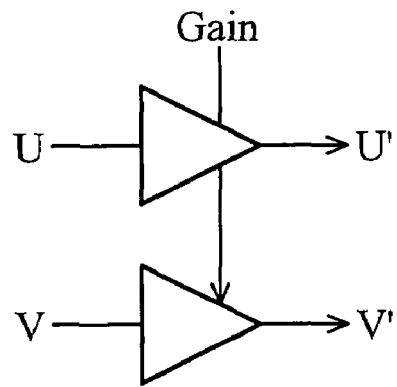
FIG. 1 shows an embodiment of modifying the saturation of a chrominance signal by applying a gain factor.
Figure 2:
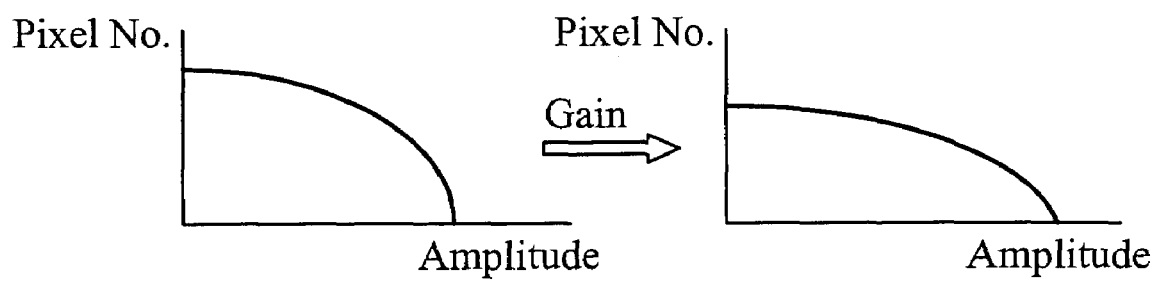
FIG. 2 shows the change in distribution of the chrominance amplitude by applying a gain factor.

A chrominance signal carries color information of the video signal, whereas a luminance signal carries brightness information of the video signal. The chrominance signal is typically a vector composed of U and V, where saturation of the color is defined by the amplitude of the vector (U, V), and hue of the color is defined by the angle of the vector (U, V). The saturation can be modified by applying a gain to both U and V components of the chrominance signal as shown in FIG. 1. A richer color can be obtained by raising the saturation; on the contrary, a paler color can be obtained by diminishing the saturation. By applying a gain to the chrominance signal as shown in FIG. 1, the saturation distribution of the chrominance signal will be varied, thus enhancing the color-saturation contrast as shown in FIG. 2.

Figure 3:
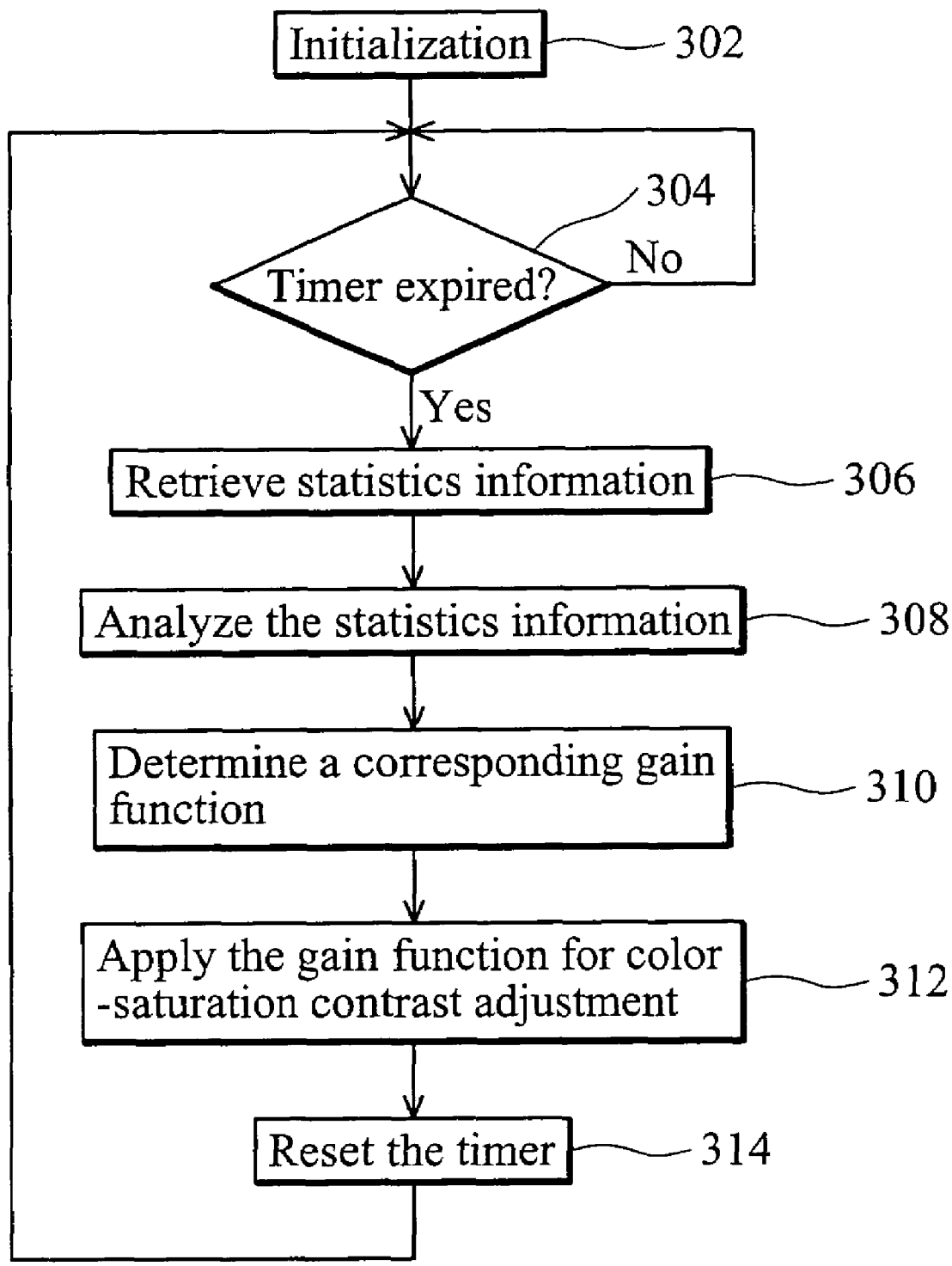
FIG. 3 is a flowchart illustrating an embodiment of a color-saturation contrast adjustment method based on chrominance information.

FIG. 3 is a flowchart illustrating an embodiment of a method for adjusting the contrast of the video signal. A gain function derived for adjusting the contrast of the video signal should be frequently updated to adapt to the context of the recent video signal. The difference between a current and a previous gain function must, however, controlled to prevent sudden change in the image. The gain function is derived so that it will not drive the chrominance signal to reach the maximum saturation value restricted by the system or output device. In Step 302, a timer is set to an initial value, and an initial gain function is selected. The initial gain function may be a linear function with a unity gain. The contrast adjustment procedure is triggered when the timer is expired (Step 304). After performing the contrast adjustment procedure (Steps 306~312), the timer is reset in Step 314. The timer may be set to a fixed or a variable value according to various circumstances. In some other embodiments, the timer is replaced by a counter, which counts the number of frames. As a result, the contrast adjustment procedure is triggered every predetermined number of frames. The contrast adjustment procedure may also be triggered by a control signal generated by the system.

Figure 4:
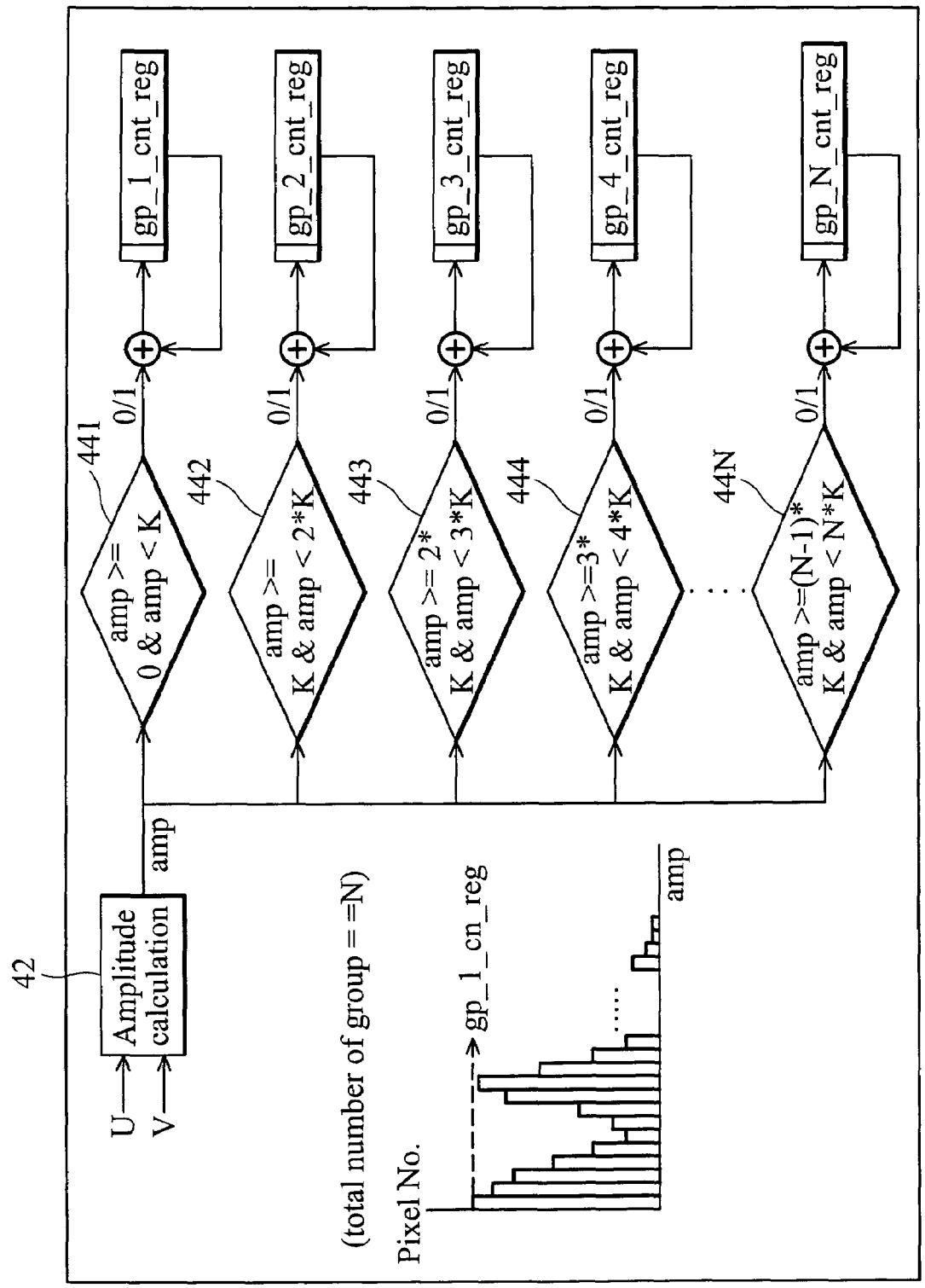
FIG. 4 is a functional block diagram illustrating an embodiment of compiling the statistical information to form an amplitude distribution for the chrominance signal.

The first step (Step 306) of the contrast adjustment procedure is to retrieve statistical information of the video signal. In a first embodiment, the statistical information is an amplitude distribution of the chrominance signal, which depicts the color-saturation of the video signal. FIG. 4 is a functional block diagram illustrating an exemplary system 4 for retrieving the distribution of the chrominance signal, which can be implemented by a circuitry or software program. An amplitude calculation block 42 computes the amplitude of the chrominance signal and sorts it into one of N groups 441~44N. An embodiment of the amplitude calculation block 42 is a CORDIC circuit composed of adders. The range of possible amplitude values is evenly divided into N groups with a group distance of K in FIG. 4, whereas in some other embodiments, dividing the range into groups with different group distances is also realizable. Each group comprises an accumulator for counting the number of pixels with an amplitude value belonging to the group. If for example, each component U and V of the chrominance signal carries an 8-bit signed value, and the group distance K is selected as 8. The maximum amplitude is $2^{8-1} \times \sqrt{2} \approx 181$, and a complete histogram distribution requires 23 groups.

The statistical information retrieved in Step 306 of FIG. 3 is further analyzed (Step 308). In some embodiments, the analysis includes detecting an exceptional situation, and gain function determination in the next step (Step 310) will depend on whether an exceptional situation occurs. For example, if the majority of pixels is determined to belong to a single group of the amplitude distribution, it is meaningless to enhance the contrast of the color-saturation. In this case, deriving a new gain function according to such single group distribution is unnecessary, thus the gain function can remain unchanged. In some embodiments, the groups of the amplitude distribution with an insignificant number of pixels can be ignored for gain function derivation as the saturation measures corresponding to these groups are assumed to be noise or outlier. In order to classify which of the groups has an insignificant number of pixels, a greatest group with the greatest number of pixels is selected, and compared with the remaining groups. In some embodiments, a difference of the pixel number between the greatest group and each group is calculated, and a group is considered as having an insignificant pixel number if the corresponding difference exceeds a preset threshold. The preset threshold may be determined according to the total pixel number analyzed for gain function determination or the pixel number of the greatest group. In some embodiments, the pixel number of each group is normalized by the pixel number of the greatest group, where a group with a normalized value less than a preset factor is considered as insignificant. Here, only a few possible exceptional situations are described, and it should be obvious to those skilled in the art that various exceptional situations can be derived from the statistical information that will influence the gain function derivation. A corresponding gain function can thus be derived based on the statistical information and possibly the detected exceptional situation.

Figure 5:
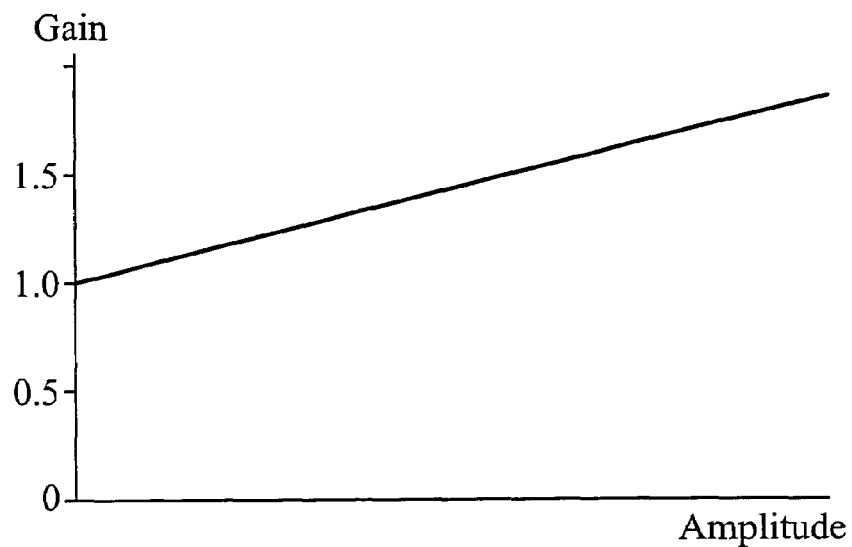
FIG. 5 is a graph showing an exemplary gain function.

In some embodiments, the gain function is simply a linear function with a positive gradient as shown in FIG. 5. The linear function is easy to implement, and has a low cost and low complexity. The gain function, however, may be a piecewise function, or a function with a higher order. A gain function with a steep slope may result in driving the maximum saturation measure of the original chrominance signal to exceed the maximum allowable value of the system or output device. It is undesirable to enhance the color-saturation of the majority of pixels to approach, reach, or even exceed the maximum allowable saturation value for output. To prevent over-enhancement of the color-saturation, the gain function should be carefully controlled. A slope of the gain function may be determined by detecting a greatest saturation measure in the current statistical information, or a non-zero pixel count group with the greatest amplitude index in the amplitude distribution. A nominal maximum slope S_max of a first order gain function can be calculated by:

$$S\_max = \frac{Amp\_max}{I \times K}$$

where I is the greatest index with non-zero pixel count, and K is the group distance. The nominal maximum slope S_max is further reduced by a margin factor MF (MF<1.0) to prevent the saturation measures concentrated in the upper values.

$S\_mg = S\_max \times MF$

A weighting factor R is applied to prevent a large slope deviation between video frames, and the slope is averaged with at least one previous slope according to the weighting factor R. A large slope deviation is undesirable as it may induce visual flashing effects.

$S\_wt = S\_mg \times R + S\_previous \times (1-R)$

A clamping mechanism is adapted to further ensure the change between a current slope and a previous slope is within a predefined value δ. An exemplary algorithm of the clamping mechanism is shown in the following by pseudo codes, where S_gf is the current slope determined for the gain function.

```
S_gf=S_wt;
If (S_gf>S_previous+δ)
    S_gf=S_previous+δ
Else if (S_gf<S_previous-δ)
    S_gf=S_previous-δ
```

Figure 6:
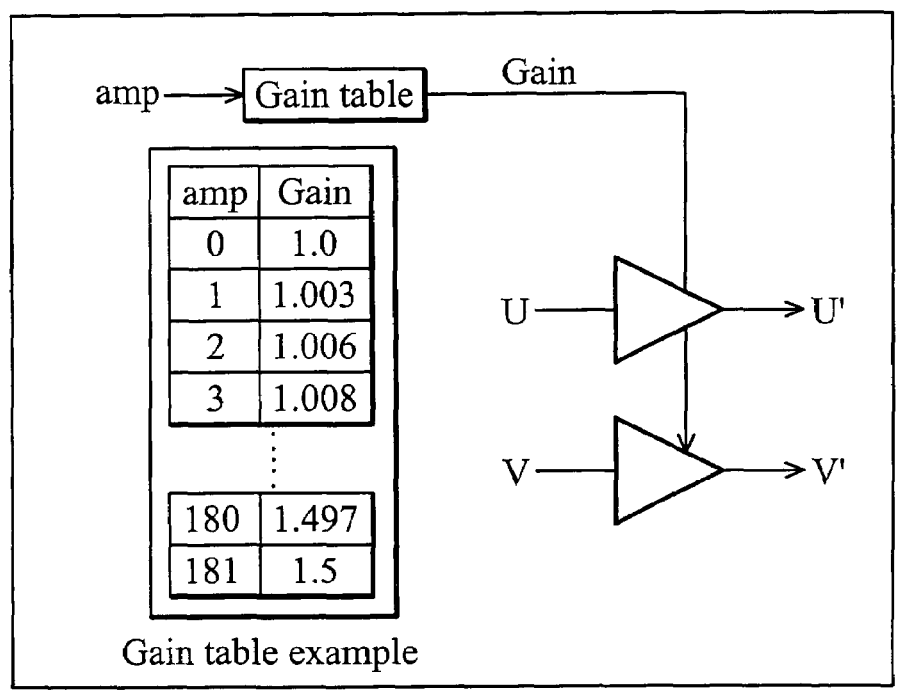
FIG. 6 is a functional block diagram illustrating an embodiment of applying a gain function to the chrominance signal.

After deriving the corresponding gain function in Step 310 of FIG. 3, the gain function is applied to the chrominance signal for contrast enhancement in Step 312. In some embodiments, applying the gain function to the chrominance signal can be realized by a gain table coupled to a gain stage as shown in FIG. 6. The gain table stores gain factors corresponding to various amplitudes of the chrominance signal according to the gain function. The gain function may be a polynomial function such as the previous discussed first order function, or a non-polynomial function. FIG. 6 shows an exemplary gain table storing a gain factor for each possible amplitude value in the case when the maximum amplitude is 181. The gain table can be set by a controller, for example, a microprocessor. The number of entries in the gain table does not necessarily have to be identical to the number of possible amplitude values. A gain table storing fewer entries can still achieve a better resolution for the gain factors by employing an interpolation algorithm. The color-saturation of the subsequent frames is adjusted by the gain stage after setting the gain table according to the gain function. The gain stage may be realized by two amplifiers for amplifying the vector components U and V of the chrominance signal respectively according to the gain factor output from the gain table. The enhanced chrominance signal will have a broader amplitude distribution, thus improving the visual effect by enhancing the color contrast.

Figure 7:
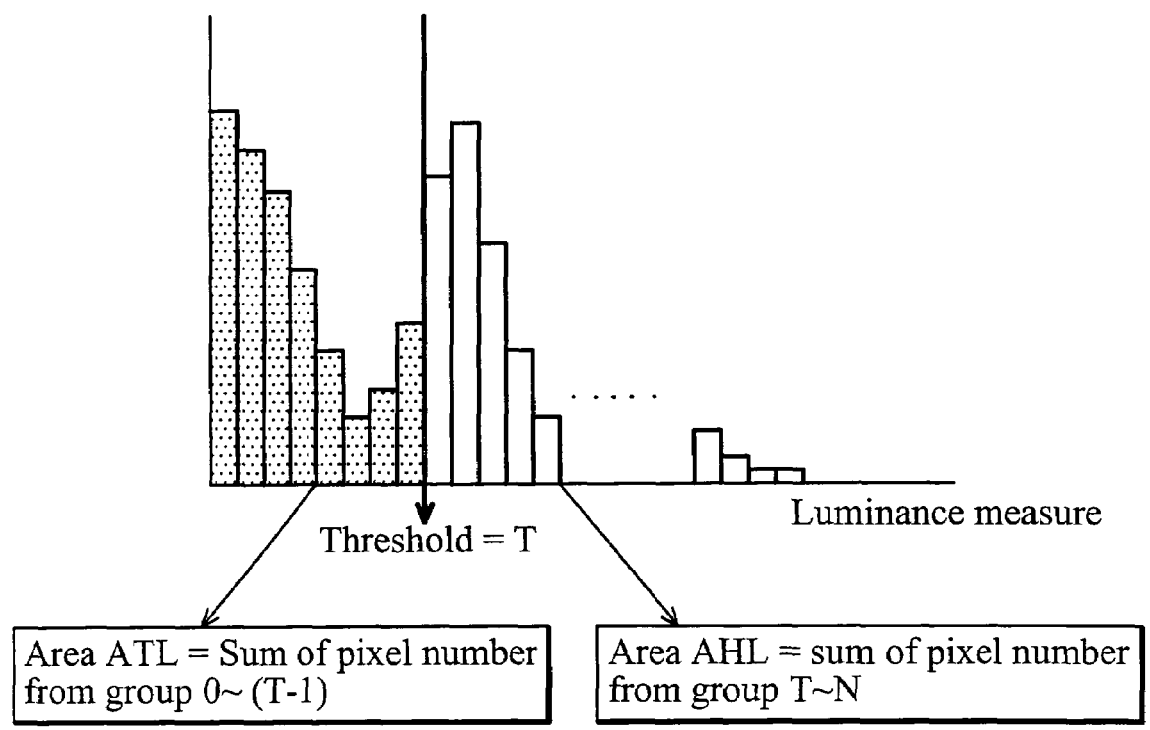
FIG. 7 is a histogram graph showing a luminance distribution.

In some embodiments, the color-saturation of the chrominance signal is enhanced based on information retrieved from the luminance signal. The statistical information retrieved from the video signal in the second embodiment is a luminance distribution gathered within a predetermined period or number of frames. FIG. 7 is a histogram graph showing an exemplary distribution of the luminance measures. A threshold T is selected to divide the luminance measures into two groups, and the statistical information is analyzed by accumulating the number of pixels in each group, where ATL is the pixel count corresponding to a luminance measure below the threshold T, and AHL is the pixel count corresponding to a luminance measure above T. A slope of the gain function is derived based on a procedure similar to the previously described embodiment. A current slope S_c is estimated according to a ratio between AHL and ATL.

$$S\_c = S\_pdm \times \left(\frac{AHL}{ATL}\right)$$

where S_pdm is a programmable parameter.

The current slope S_c is then averaged with at least one previous slope S_prev_L with a weighting factor W to prevent rapid slope change between the gain functions.

$$S\_wL = S\_prev\_L \times W + S\_c \times (1-W)$$

Again, the calculated slope S_wL can be further checked with the previous slope S_prev_L by a clamping algorithm, so the slope change is restricted by a maximum allowable change δ_SL.

```
S_gL=S_wt;
If (S_gL>S_prev_L+δ_SL)
    S_gL=S_prev_L+δ_SL
Else if (S_gL<S_prev_L-δ_SL)
    S_gL=S_prev_L-δ_SL
```

Where S_gL is the final slope of the gain function for color-saturation adjustment.

Figure 8:
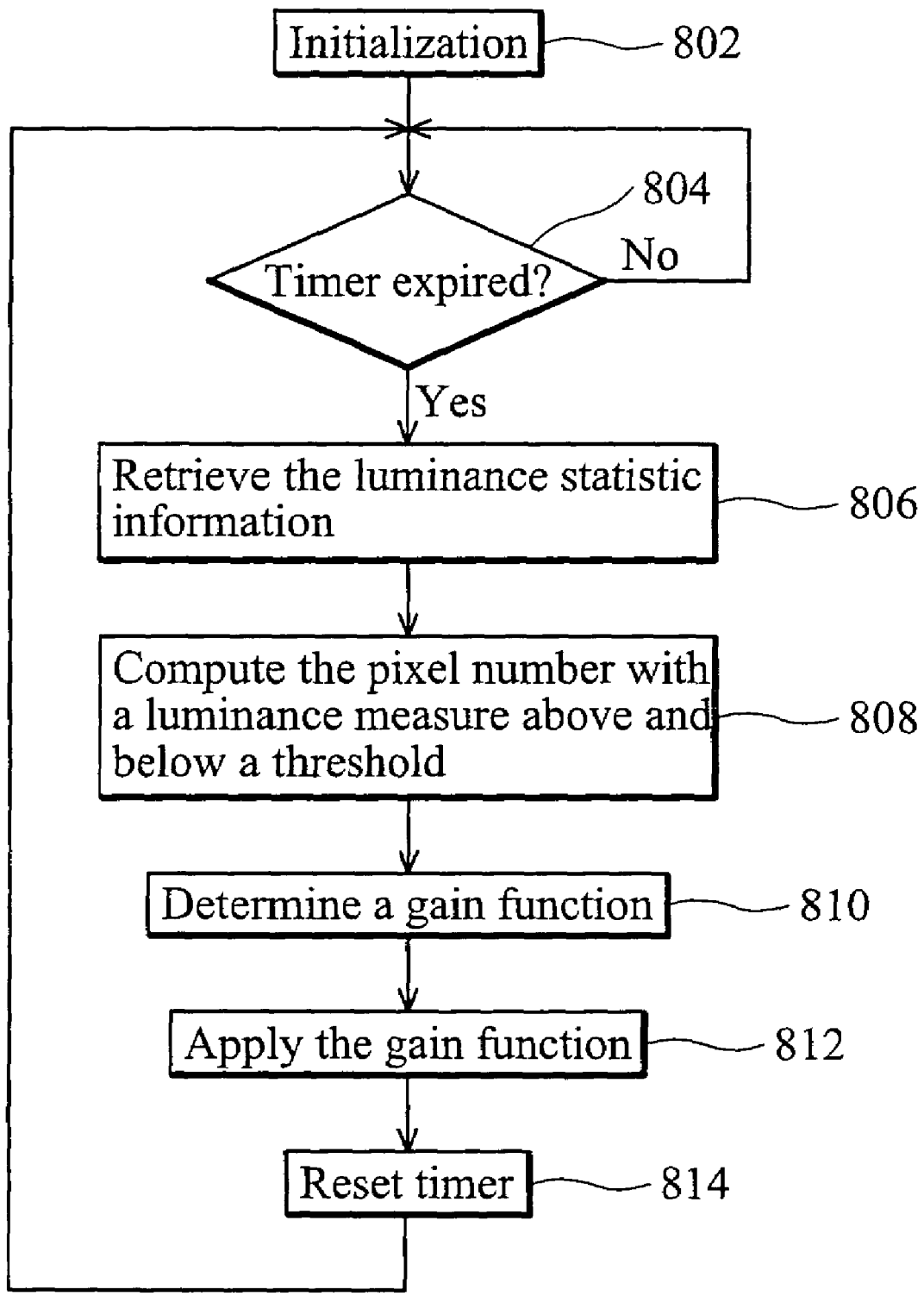
FIG. 8 is a flowchart illustrating an embodiment of a color-saturation contrast adjustment method based on luminance information.

FIG. 8 is a flowchart illustrating an exemplary contrast adjustment method based on information retrieved from the luminance signal. A timer is initialized and an initial gain function is select in Step 802. The timer determines how often the color-saturation contrast of the video signal should be adjusted based on the luminance information. A counter counting the number of frames or pixels may replace the timer. The timer or the counter also determines the amount of statistical information gathered for contrast adjustment, for example, more pixels are collected for statistical analysis if the timer has a longer period. The contrast adjustment process is triggered when the timer expires (Step 804) or when the counter reaches a predetermined number of frames or pixels. Luminance information retrieved from the collected pixels is compiled to form a histogram (Step 806). The pixel counts belonging to each of the two groups ATL and AHL as previously described are computed in Step 808. In Steps 810 and 812, a slope of the gain function is derived based on the luminance information, and the gain function is applied to the chrominance signal. The timer and the collected statistics are reset in Step 814 when the contrast adjustment procedure is complete.

Figure 9:
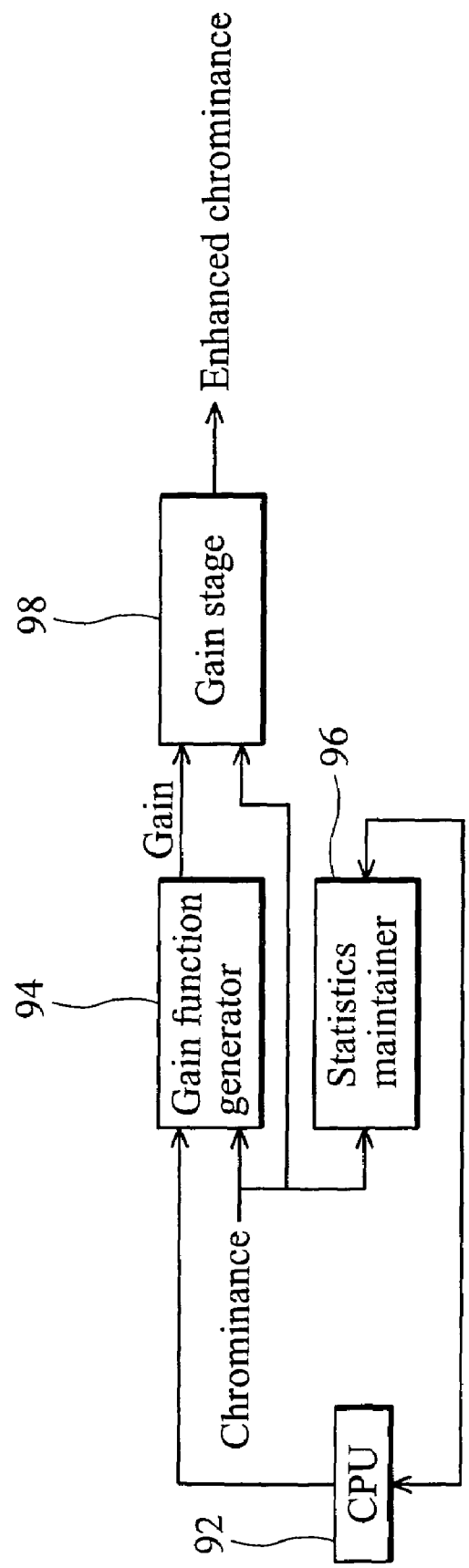
FIG. 9 is a block diagram showing an embodiment of the system for adjusting the color-saturation contrast of a video signal.

FIG. 9 is a block diagram showing an embodiment of a system for contrast adjustment. The system comprises a computing unit, which can be realized by a central processing unit (CPU) 92, and a statistical maintainer 96 for collecting and maintaining statistical information. The statistic maintainer 96 comprises storage elements such as a memory or registers. The system further comprises a gain function generator 94 and a gain stage 98. The embodiment of FIG. 9 utilizes information obtained in the chrominance signal as the basis for color-saturation adjustment. The chrominance signal is provided to the statistical maintainer 96 and the statistical maintainer 96 stores the magnitude measure of the chrominance signal for each pixel. The CPU 92 retrieves the magnitude measures from the statistical maintainer and classifies the magnitude measures into a preset number of groups. The CPU 92 may also updates the statistical information stored in the statistical maintainer 96 in some embodiments. An exceptional situation detected according to the statistical information, for example, when majority of the collected pixels having similar color saturation, is also a factor for generating the gain function. The gain function generator 94 derives the gain function utilizing the statistical information and possibly the exceptional situation, and outputs a gain factor for each pixel corresponding to its chrominance magnitude measure. The gain stage 98 receives the chrominance signal along with the gain factors output by the gain function generator 94, and amplifies the magnitude of the chrominance signal by the gain factors, thereby generating an enhanced chrominance signal with a broader color-saturation distribution.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for adjusting the contrast of a video signal, comprising:
   conducting statistical computation to retrieve statistical information of an amplitude of a chrominance signal;
   detecting an occurrence of an exceptional situation according to the statistical information;
   deriving a gain function based on the statistical information and the detection result of the exceptional situation; and
   applying the gain function to the video signal to modify the amplitude of the chrominance signal;
   wherein the statistical information is a distribution analysis of the amplitude of the chrominance signal; and
   conducting the statistical computation further comprises dividing possible values of the amplitude of the chrominance signal into groups, and counting a number of pixels belonging to each group.

2. The method for adjusting the contrast of a video signal according to claim 1, wherein applying the gain function to the video signal further comprising:
   generating a gain table in accordance with the gain function, wherein the gain table contains gain factors corresponding to various amplitudes of the chrominance signal; and
   adjusting the amplitude of the chrominance signal for each pixel by multiplying a gain factor in the gain table corresponding to the original amplitude.

3. The method for adjusting the contrast of a video signal according to claim 1, further comprising:
   setting a timer; and
   conducting statistical computation for contrast adjustment when the timer is expired.

4. The method for adjusting the contrast of a video signal according to claim 1, wherein the statistical computation is conducted for contrast adjustment every predetermined number of frames.

5. The method for adjusting the contrast of a video signal according to claim 1, wherein the gain function is a linear function with a positive slope or a piecewise linear function which could broaden the amplitude distribution of the chrominance signal.

6. The method for adjusting the contrast of a video signal according to claim 5, wherein the slope is determined by calculating a maximum allowable slope based on the statistical information, and averaging the maximum allowable slope with at least one previous slope in accordance with a weighting factor.

7. The method for adjusting the contrast of a video signal according to claim 6, further comprising clamping the slope to prevent a slope change between the current slope and previous slope exceeding a predefined value delta.

8. The method for adjusting the contrast of a video signal according to claim 6, further comprising reducing the maximum allowable slope by a margin factor before averaging with at least one previous slope.

9. The method for adjusting the contrast of a video signal according to claim 1, wherein the statistical information comprises the saturation of the chrominance signal and the conducting statistical computation step further comprising:
   retrieving a decoded vector (U,V) from the chrominance signal; and
   obtaining the statistical information by calculating an amplitude of the decoded vector ($\sqrt{U^2+V^2}$).

10. The method for adjusting the contrast of a video signal according to claim 1, wherein the occurrence of the exceptional situation is detected when the number of pixels belonging to one of the groups exceeds a ratio of the total number of pixels analyzed for retrieving the statistical information, and derivation of the gain function is skipped if the exceptional situation is detected.

11. The method for adjusting the contrast of a video signal according to claim 1, further comprising:
    determining a greatest group with a greatest number of pixels belonging to the group;
    calculating a difference or a ratio of the number of pixels between the greatest group and each group;
    comparing the difference or ratio with a first threshold, and the exceptional situation is detected if the difference or ratio of a group exceeds the first threshold; and
    ignoring the group corresponding to the exceptional situation when deriving the gain function.

12. The method for adjusting the contrast of a video signal according to claim 1, further comprising conducting statistical computation to retrieve statistical information of the level of a luminance signal.

13. The method for adjusting the contrast of a video signal according to claim 12, wherein the statistical information comprises the number of pixels with a luminance level above and below a first threshold, and the method further comprising determining a slope of the gain function based on a ratio between the number of pixels above and below the first threshold, and averaging the determined slope with at least one previous slope in accordance with a weighting factor.

14. The method for adjusting the contrast of a video signal according to claim 13, further comprising clamping the slope to prevent a slope change between the current slope and previous slope exceeding a predefined value delta.

15. A system for adjusting the contrast of a video signal, comprising:
    a memory, collecting and storing statistical information of an amplitude of a chrominance signal;
    a computing unit, conducting statistical computation by accessing statistical information from the memory, and detecting an occurrence of an exceptional situation according to the statistical information;
    a gain function generator, deriving a gain function based on the statistical information and possibly the exceptional situation calculated and detected by the computing unit; and
    a gain stage, applying the gain function derived by the gain function generator to the video signal to generate an enhanced video signal by modifying the amplitude of the chrominance signal;
    wherein the statistical information retrieved by the computing unit is a distribution analysis of the amplitude of the chrominance signal; and the computing unit divides possible values of the amplitude of the chrominance signal into groups, and counts a number of pixels belonging to each group.

16. The system for adjusting the contrast of a video signal according to claim 15, wherein the gain stage comprises:
    a gain table, mapping gain factors with various amplitudes of the chrominance signal in accordance with the gain function derived by the gain function generator; and a multiplier, adjusting the amplitude of the chrominance signal for each pixel by multiplying a gain factor retrieved from the gain table corresponding to the original amplitude.

17. The system for adjusting the contrast of a video signal according to claim 15, further comprising:
a timer, notifying the computing unit to conduct statistical computation for contrast adjustment when the timer expires.

18. The system for adjusting the contrast of a video signal according to claim 15, wherein the computing unit conducts statistical computation for contrast adjustment every predetermined number of frames.

19. The system for adjusting the contrast of a video signal according to claim 15, wherein the gain function generator determines a slope of the gain function.

20. The system for adjusting the contrast of a video signal according to claim 19, wherein the gain function generator determines the slope by calculating a maximum allowable slope based on the statistical information, and averaging the maximum allowable slope with at least one previous slope in accordance with a weighting factor.

21. The system for adjusting the contrast of a video signal according to claim 20, wherein the gain function generator clamps the slope to prevent a slope change between the current slope and previous slope exceeding a predefined value delta.

22. The system for adjusting the contrast of a video signal according to claim 21, wherein the gain function generator reduces the maximum allowable slope by a margin factor before averaging with at least one previous slope.

23. The system for adjusting the contrast of a video signal according to claim 15, wherein the computing unit conducts statistical computation by calculating the saturation of the chrominance signal.

24. The system for adjusting the contrast of a video signal according to claim 23, wherein the computing unit comprises a CORDIC circuit for calculating the amplitude of a decoded vector (U,V) from the chrominance signal ($\sqrt{U^2+V^2}$).

25. The system for adjusting the contrast of a video signal according to claim 15, wherein the computing unit detects the exceptional situation if the number of pixels belonging to one of the groups exceeds a ratio of the total number of pixels analyzed for retrieving the statistical information, and skips deriving the gain function when detecting the exceptional situation.

26. The system for adjusting the contrast of a video signal according to claim 15, wherein the computing unit determines a greatest group with a greatest number of pixels belonging to the group, calculates a difference or a ratio of the number of pixels between the greatest group and each group, compares the difference or ratio with a first threshold, detects the exceptional situation if the difference or ratio of a group exceeds the first threshold, and ignores the group corresponding to the exceptional situation for deriving of the gain function.

27. The system for adjusting the contrast of a video signal according to claim 16, wherein the computing unit further conducts statistical computation by calculating the level of a luminance signal.

28. The system for adjusting the contrast of a video signal according to claim 27, wherein the statistical information comprises the number of pixels with a luminance level above and below a first threshold, and the gain function generator determines a slope of the gain function based on a ratio between the number of pixels above and below the first threshold, and averaging the determined slope with at least one previous slope in accordance with a weighting factor.

* * * * *